US012115624B2

(12) United States Patent
Scales

(10) Patent No.: US 12,115,624 B2
(45) Date of Patent: Oct. 15, 2024

(54) FIRE HYDRANT TOOL

(71) Applicant: William Scales, Winchester, OH (US)

(72) Inventor: William Scales, Winchester, OH (US)

( * ) Notice: Subject to any disclaimer, the term of this patent is extended or adjusted under 35 U.S.C. 154(b) by 312 days.

(21) Appl. No.: 17/827,871

(22) Filed: May 30, 2022

(65) Prior Publication Data

US 2023/0381932 A1 Nov. 30, 2023

(51) Int. Cl.

| | |
|---|---|
| ***B25B 21/00*** | (2006.01) |
| ***A62C 99/00*** | (2010.01) |
| ***B25B 13/46*** | (2006.01) |
| ***B25F 5/02*** | (2006.01) |

(52) U.S. Cl.
CPC .......... *B25B 21/002* (2013.01); *A62C 99/009* (2013.01); *B25B 13/462* (2013.01); *B25F 5/02* (2013.01)

(58) Field of Classification Search
CPC ..... B25B 21/00; B25B 21/002; B25B 13/462; B25F 5/02; B25F 5/026; A62C 99/009
See application file for complete search history.

(56) References Cited

U.S. PATENT DOCUMENTS

| | | | | |
|---|---|---|---|---|
| 3,939,924 | A * | 2/1976 | Grabovac | B25B 23/1427 D8/24 |
| D263,674 | S | 4/1982 | Ebert | |
| 5,109,739 | A * | 5/1992 | Hull | B60B 29/003 81/463 |
| 5,428,853 | A | 7/1995 | Menke | |
| 6,220,124 | B1 | 4/2001 | Perkins | |
| 6,354,178 | B2 | 3/2002 | Pool | |
| 6,776,068 | B2 * | 8/2004 | Reuschel | B25B 21/00 81/57.32 |
| 6,899,001 | B1 | 5/2005 | Sanders | |
| 8,677,862 | B2 | 3/2014 | Backlund | |
| 11,471,956 | B2 * | 10/2022 | Kagawa | B25B 23/0078 |
| 11,504,829 | B2 * | 11/2022 | Pannone | B25B 21/00 |

* cited by examiner

*Primary Examiner* — David B. Thomas

(57) ABSTRACT

A fire hydrant tool for opening a fire hydrant in a controlled manner includes a cordless tool that has an output shaft and a trigger. A socket is attachable to the output shaft of the cordless tool and the socket has dimensions matching a top nut of a fire hydrant thereby facilitating the cordless tool to open the fire hydrant. A rod is attachable to the handle of the cordless tool thereby facilitating the rod to be gripped for manipulating the cordless tool. A ratchet driver is attached to the rod and the socket is attachable to the ratchet driver when the cordless tool has insufficient torque to loosen the top nut. A prying tool is coupled to the rod and the prying tool has a claw element and a hook element to grip an object for prying the object.

6 Claims, 5 Drawing Sheets

FIRE HYDRANT TOOL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hydrant devices and more particularly pertains to a new hydrant device for opening a fire hydrant in a controlled manner. The device includes a cordless tool, a socket that is attachable to the cordless tool and a rod that is insertable into the cordless tool. The socket has dimensions that match the top nut of a fire hydrant to facilitate the cordless tool to open the fire hydrant in a slow and controlled manner. The rod has a prying tool and a ratchet drive that can engage the socket when the cordless tool has insufficient torque to rotate the top nut.

(2) Description of Related Art Including Information Disclosed Under 37 CFR 1.97 and 1.98

The prior art relates to hydrant devices including a fireman's hand tool that includes a window breaker and a pry bar. The prior art discloses a fire hydrant wrench that has a pentagonal aperture for engaging a top nut of a fire hydrant. The prior art discloses a fan clutch wrench that includes a cordless tool, an extension and a wrench that engages a fan clutch and which is attachable to the extension. The prior art discloses a wrench that has a pair of apertures for engaging fire control devices. The prior art discloses a fire hydrant wrench that includes a primary handle, a secondary handle and a motor mounted to the primary handle.

BRIEF SUMMARY OF THE INVENTION

An embodiment of the disclosure meets the needs presented above by generally comprising a cordless tool that has an output shaft and a trigger. A socket is attachable to the output shaft of the cordless tool and the socket has dimensions matching a top nut of a fire hydrant thereby facilitating the cordless tool to open the fire hydrant. A rod is attachable to the handle of the cordless tool thereby facilitating the rod to be gripped for manipulating the cordless tool. A ratchet driver is attached to the rod and the socket is attachable to the ratchet driver when the cordless tool has insufficient torque to loosen the top nut. A prying tool is coupled to the rod and the prying tool has a claw element and a hook element to grip an object for prying the object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
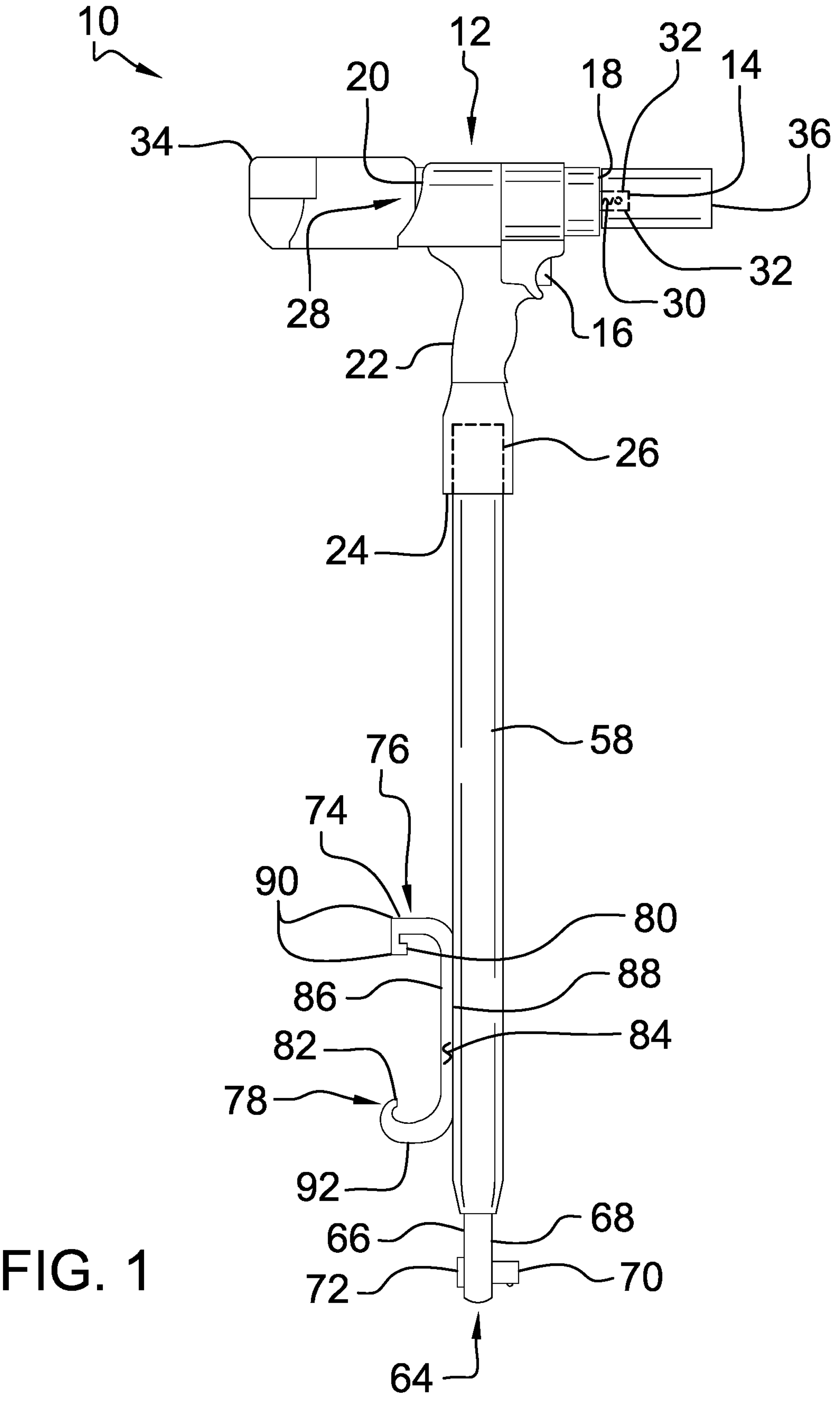
FIG. 1 is a perspective view of a fire hydrant tool according to an embodiment of the disclosure.
Figure 2:
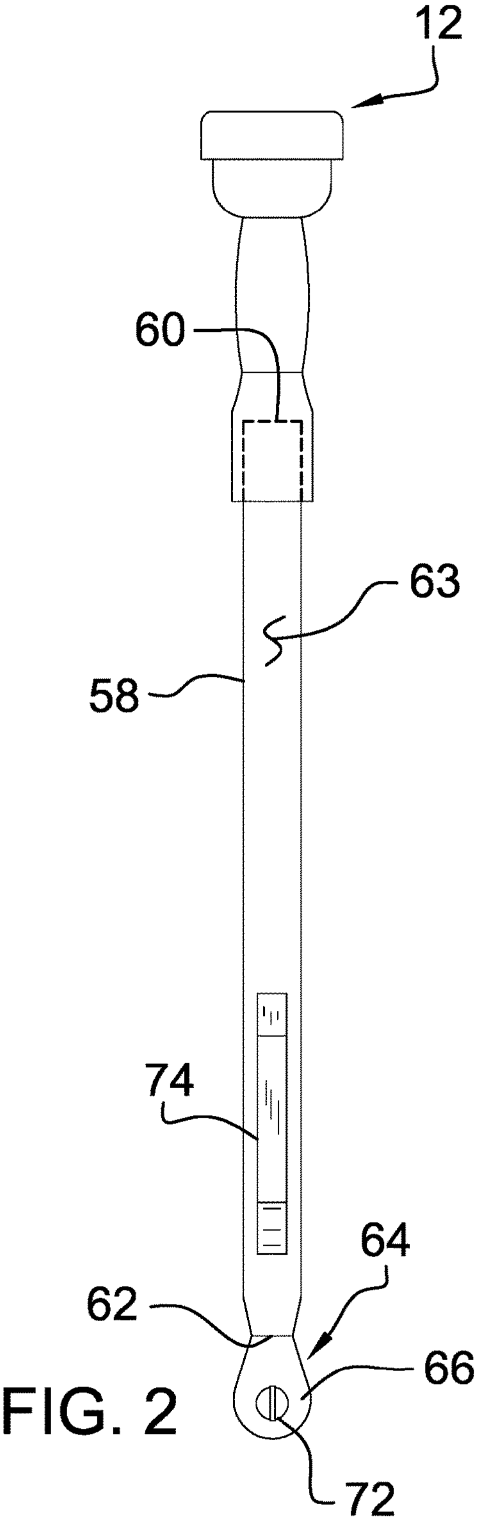
FIG. 2 is a back view of an embodiment of the disclosure.
Figure 3:
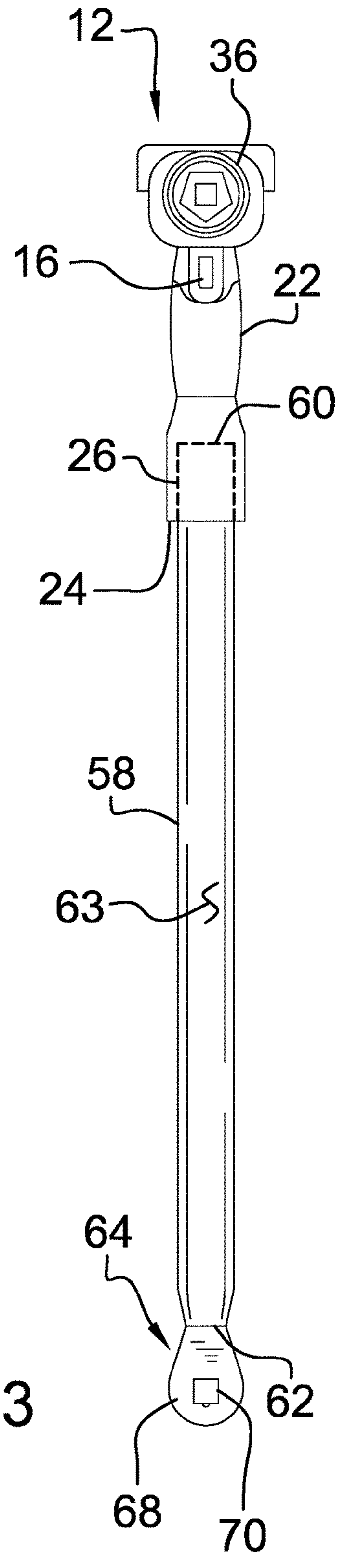
FIG. 3 is a front view of an embodiment of the disclosure.
Figure 4:
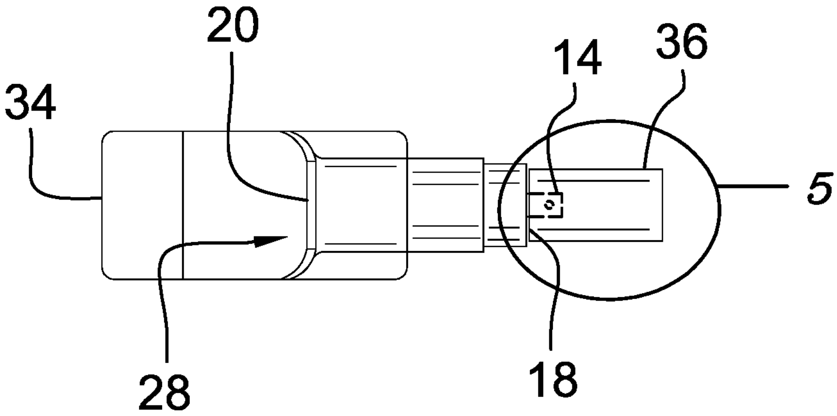
FIG. 4 is a top view of an embodiment of the disclosure.
Figure 5:
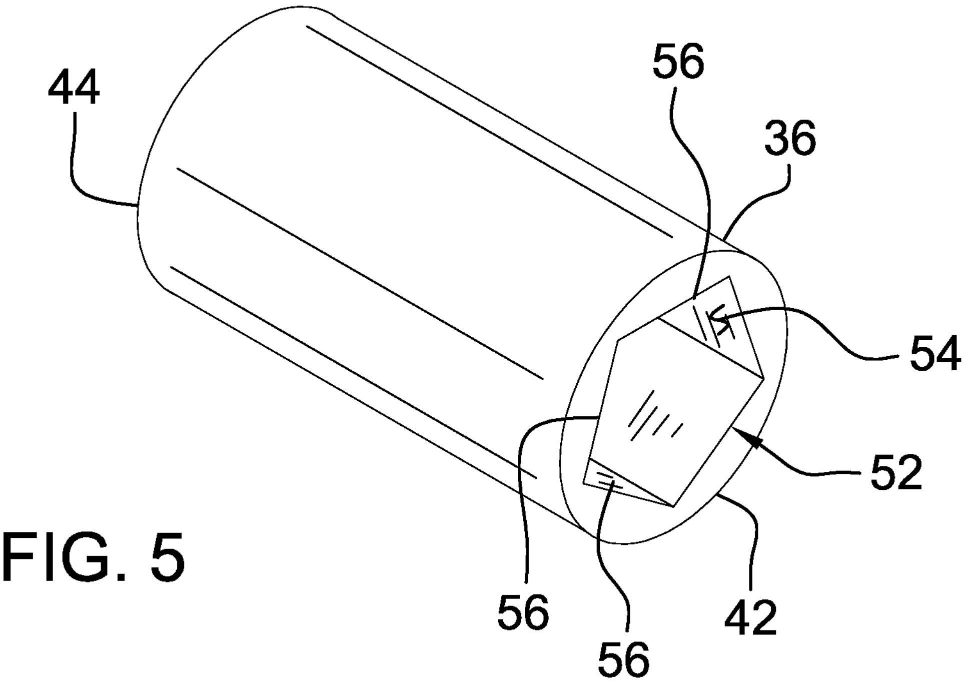
FIG. 5 is a front perspective view of a socket of an embodiment of the disclosure.
Figure 6:
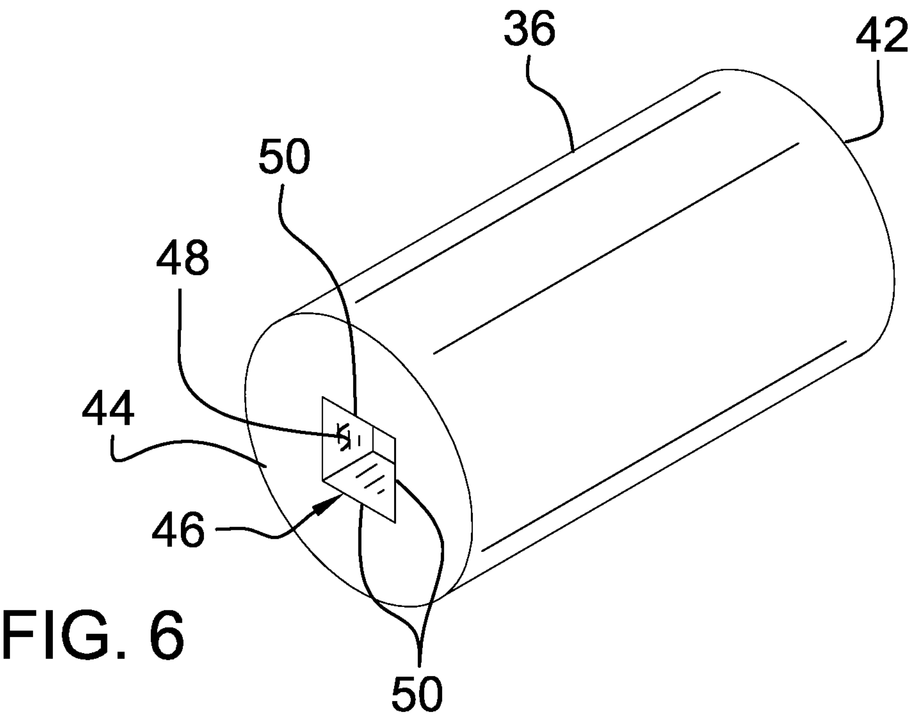
FIG. 6 is a back perspective view of a socket of an embodiment of the disclosure.
Figure 7:
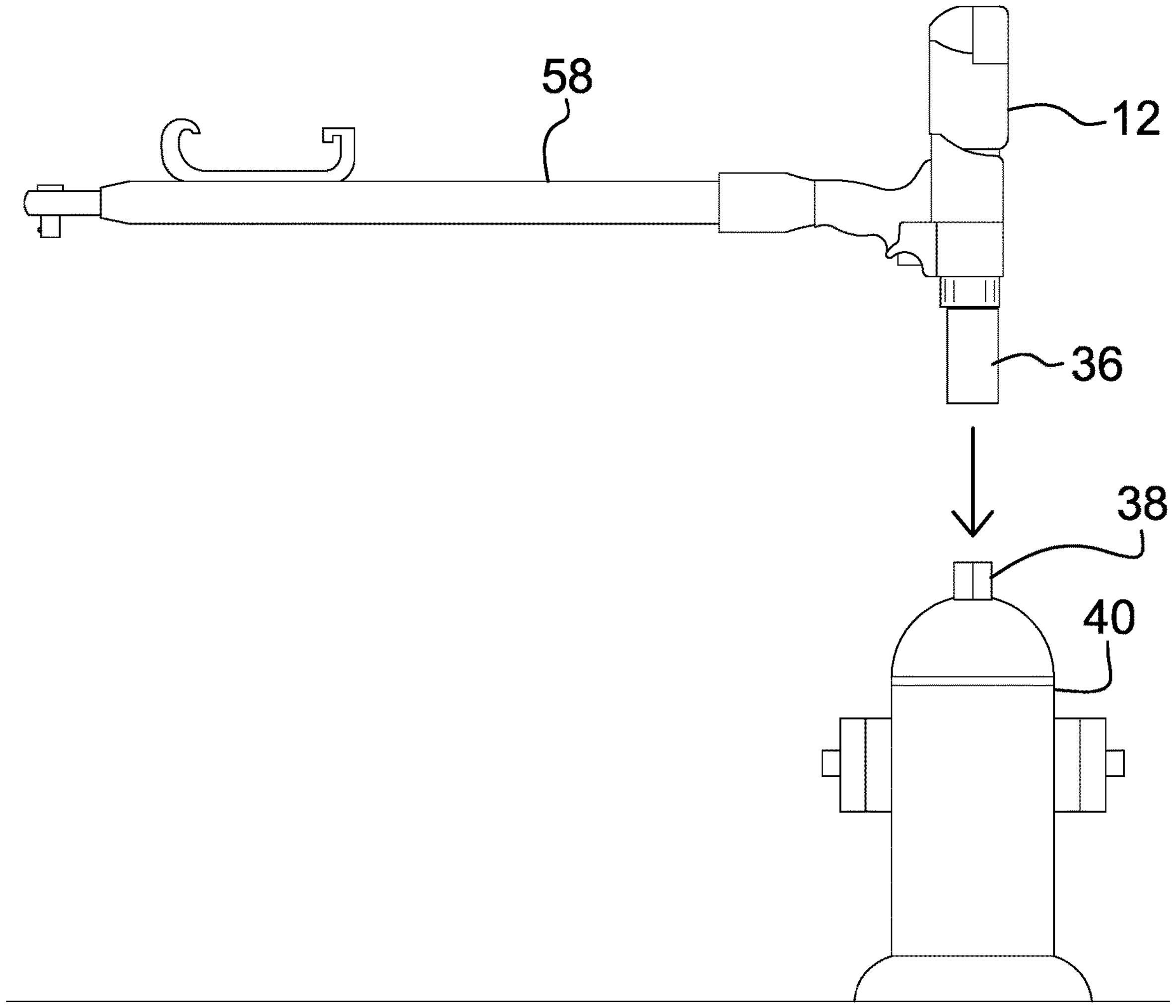
FIG. 7 is a perspective in-use view of an embodiment of the disclosure.

With reference now to the drawings, and in particular to FIGS. 1 through 7 thereof, a new hydrant device embodying the principles and concepts of an embodiment of the disclosure and generally designated by the reference numeral 10 will be described.

As best illustrated in FIGS. 1 through 7, the fire hydrant tool 10 generally comprises a cordless tool 12 that has an output shaft 14 and a trigger 16, and the output shaft 14 is rotated when the trigger 16 is depressed. The cordless tool 12 has a front end 18, a back end 20 and a handle 22 extending downwardly from the cordless tool 12 having the handle 22 being centrally positioned between the front end 18 and the back end 20. The handle 22 has a bottom end 24, the handle 22 has a rod well 26 extending into the bottom end 24 and the cordless tool 12 has a battery port 28 extending into the back end 20. The output shaft 14 is disposed on the front end 18, the output shaft 14 has an outer surface 30 and the outer surface 30 has a plurality of intersecting sides 32 such that the output shaft 14 has a cubic shape. Furthermore, the trigger 16 is movably disposed on the handle 22 and the cordless tool 12 includes a battery 34 that is insertable into the battery port 28 for powering the cordless tool 12.

A socket 36 is attachable to the output shaft 14 of the cordless tool 12 such that the cordless tool 12 rotates the socket 36. Additionally, the socket 36 has dimensions matching a top nut 38 of a fire hydrant 40 thereby facilitating the cordless tool 12 to open the fire hydrant 40. The fire hydrant 40 may be a fire hydrant of any conventional design that is commonly employed in cities and municipalities in the United States of America. The socket 36 has a forward end 42 and a rear end 44, and the socket 36 has an output well 46 extending into the rear end 44. The output well 46 has a bounding surface 48 and the bounding surface 48 has a plurality of intersecting sides 50 such that the output well 46 has a rectangular shape.

The output well 46 insertably receives the output shaft 14 of the cordless tool 12 and each of the intersecting sides 32 of the outer surface 30 of the output shaft 14 conforms to a respective one of the intersecting sides 50 of the bounding surface 48 of the output well 46 thereby facilitating the output shaft 14 to rotate the socket 36 when the cordless tool 12 is turned on. The socket 36 has a nut well 52 extending into the forward end 42 of the socket 36, the nut well 52 has a bounding surface 54 and the bounding surface 54 of the nut well 52 has a plurality of intersecting sides 56 such that the nut well 52 has a pentagonal shape thereby facilitating the nut well 52 to conform to the top nut 38 of the fire hydrant 40 for rotating the top nut 38. The output shaft 14 may have a maximum rotational speed of 100.0 rpm thereby facilitating the fire hydrant 40 to be opened slowly to inhibit water hammering that can damage fire control equipment such as a fire engine, water tenders and other fire control equipment commonly employed by municipal fire departments.

A rod 58 is attachable to the handle 22 of the cordless tool 12 thereby facilitating the rod 58 to be gripped for manipulating the cordless tool 12. The rod 58 has a top end 60, a bottom end 62 and an outer surface 63 extending between the top end 60 and the bottom end 62 of the rod 58. Additionally, the top end 60 is insertable into the rod well 26 in the bottom end 24 of the handle 22 of the cordless tool 12. A ratchet driver 64 is attached to the rod 58 and the socket 36 is attachable to the ratchet driver 64 thereby facilitating the rod 58 to be manipulated to loosen the top nut 38 on the fire hydrant 40 when the cordless tool 12 has insufficient torque to loosen the top nut 38.

The ratchet driver 64 is disposed on the bottom end 24 of the rod 58 and the ratchet driver 64 has a top face 66 and a bottom face 68. The ratchet driver 64 is oriented such that an axis extending between the top face 66 and the bottom face 68 is perpendicularly oriented with an axis extending between the top end 60 and the bottom end 24 of the rod 58. The ratchet driver 64 has an output 70 shaped in a cube thereby facilitating the output 70 to engage the output well 46 in the rear end 44 of the socket 36. The output 70 is rotatably disposed on the bottom face 68 of the ratchet driver 64 and the ratchet driver 64 includes a direction knob 72 that is rotatably disposed on the top face 66. The direction knob 72 is in mechanical communication with the output 70 to adjust a rotational direction of the output 70 between a counterclockwise direction and a clockwise direction.

A prying tool 74 is coupled to the rod 58 and the prying tool 74 has a claw element 76 and a hook element 78 which can each grip an object for prying the object. The prying tool 74 has a first end 80, a second end 82 and an outside surface 84 extending between the first end 80 and the second end 82, and the outside surface 84 has a front side 86 and a back side 88. The prying tool 74 has a series of bends 90 that are spaced apart from each other and are distributed from the first end 80 toward the second such that the first end 80 is directed toward the front side 86 of the outside surface 84 thereby defining the claw element 76. The prying tool 74 has a curve 92 extending from the second end 82 toward the first end 80 such that the second end 82 is directed toward the front side 86 of the outside surface 84 thereby defining the hook element 78. The back side 88 of the outside surface 84 is attached to the outer surface 30 of the rod 58 at a connection point extending between the curve 92 and the series of bends 90. Furthermore, the prying tool 74 is positioned closer to the bottom end 24 of the rod 58 than the top end 60 of the rod 58.

In use, the socket 36 is attached to the cordless tool 12 and the socket 36 is placed on the top nut 38 of the fire hydrant 40. The trigger 16 is depressed to turn on the cordless tool 12 for opening the top nut 38. In this way the fire hydrant 40 is opened in a slow and controlled fashion to inhibit water hammering that can occur if the fire hydrant 40 is opened too rapidly. The ratchet driver 64 can be attached to the socket 36 instead of the cordless tool 12 the manually open the fire hydrant 40 when the cordless tool 12 does not have sufficient torque to rotate the top nut 38. Additionally, the prying tool 74 can be employed for prying doors or other objects that are stuck or immovable.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A fire hydrant tool for opening a fire hydrant in a slow and controlled manner for reducing damage to fire control equipment, said fire hydrant tool comprising:

a cordless tool having an output shaft and a trigger, said output shaft being rotated when said trigger is depressed;

a socket being attachable to said output shaft of said cordless tool such that said cordless tool rotates said socket, said socket having dimensions matching a top nut of a fire hydrant thereby facilitating said cordless tool to open the fire hydrant;

a rod being attachable to a handle of said cordless tool thereby facilitating said rod to be gripped for manipulating said cordless tool;

a ratchet driver being attached to said rod, said socket being attachable to said ratchet driver thereby facilitating said rod to be manipulated to loosen the top nut on the fire hydrant when said cordless tool has insufficient torque to loosen the top nut; and a prying tool being coupled to said rod, said prying tool having a claw element and a hook element wherein each of said claw element and said hook element are each configured to grip an object for prying the object.

2. The fire hydrant tool according to claim 1, wherein:

said cordless tool has a front end, a back end and said handle extending downwardly from said cordless tool and being centrally positioned between said front end and said back end, said handle having a bottom end, said handle having a rod well extending into said bottom end, said cordless tool having a battery port extending into said back end, said output shaft being disposed on said front end;

said output shaft has an outer surface, said outer surface having a plurality of intersecting sides such that said output shaft has a cubic shape;

said trigger is movably disposed on said handle; and said cordless tool includes a battery being insertable into said battery port for powering said cordless tool.

3. The fire hydrant tool according to claim 2, wherein said socket has a forward end and a rear end, said socket having a output well extending into said rear end, said output well having a bounding surface, said bounding surface having a plurality of intersecting sides such that said output well has a rectangular shape, said output well insertably receiving said output shaft of said cordless tool, each of said intersecting sides of said outer surface of said output shaft conforming to a respective one of said intersecting sides of said bounding surface of said output well thereby facilitating said output shaft to rotate said socket when said cordless tool is turned on, said socket having a nut well extending into said forward end of said socket, said nut well having a bounding surface, said bounding surface of said nut well having a plurality of intersecting sides such that said nut well has a pentagonal shape thereby facilitating said nut well to conform to the top nut of the fire hydrant for rotating the top nut.

4. The fire hydrant tool according to claim 2, wherein:

said rod has a top end, a bottom end and an outer surface extending between said top end and said bottom end, said top end being insertable into said rod well in said bottom end of said handle of said cordless tool;

said ratchet driver is disposed on said bottom end of said rod, said ratchet driver having a top face and a bottom face, said ratchet driver being oriented such that an axis extending between said top face and said bottom face is perpendicularly oriented with an axis extending between said top end and said bottom end of said rod;

said ratchet driver has an output being shaped in a cube thereby facilitating said output to engage said output well in said rear end of said socket, said output being rotatably disposed on said bottom face of said ratchet driver; and said ratchet driver includes a direction knob being rotatably disposed on said top face, said direction knob being in mechanical communication with said output to adjust a rotational direction of the output between a counterclockwise direction and a clockwise direction.

5. The fire hydrant tool according to claim 4, wherein:

said prying tool has a first end, a second end and an outside surface extending between said first end and said second end, said outside surface having a front side and a back side;

said prying tool has a series of bends being spaced apart from each other and being distributed from the first end toward said second such that said first end is directed toward said front side of said outside surface thereby defining said claw element;

said prying tool has a curve extending from said second end toward said first end such that said second end is directed toward said front side of said outside surface thereby defining said hook element; and said back side of said outside surface is attached to said outer surface of said rod at a connection point extending between said curve and said series of bends, said prying tool being positioned closer to said bottom end of said rod than said top end of said rod.

6. A fire hydrant tool for opening a fire hydrant in a slow and controlled manner for reducing damage to fire control equipment, said fire hydrant tool comprising:

a cordless tool having an output shaft and a trigger, said output shaft being rotated when said trigger is depressed, said cordless tool having a front end, a back end and a handle extending downwardly from said cordless tool and being centrally positioned between said front end and said back end, said handle having a bottom end, said handle having a rod well extending into said bottom end, said cordless tool having a battery port extending into said back end, said output shaft being disposed on said front end, said output shaft having an outer surface, said outer surface having a plurality of intersecting sides such that said output shaft has a cubic shape, said trigger being movably disposed on said handle, said cordless tool including a battery being insertable into said battery port for powering said cordless tool;

a socket being attachable to said output shaft of said cordless tool such that said cordless tool rotates said socket, said socket having dimensions matching a top nut of a fire hydrant thereby facilitating said cordless tool to open the fire hydrant, said socket having a forward end and a rear end, said socket having a output well extending into said rear end, said output well having a bounding surface, said bounding surface having a plurality of intersecting sides such that said output well has a rectangular shape, said output well insertably receiving said output shaft of said cordless tool, each of said intersecting sides of said outer surface of said output shaft conforming to a respective one of said intersecting sides of said bounding surface of said output well thereby facilitating said output shaft to rotate said socket when said cordless tool is turned on, said socket having a nut well extending into said forward end of said socket, said nut well having a bounding surface, said bounding surface of said nut well having a plurality of intersecting sides such that said nut well has a pentagonal shape thereby facilitating said nut well to conform to the top nut of the fire hydrant for rotating the top nut;

a rod being attachable to said handle of said cordless tool thereby facilitating said rod to be gripped for manipulating said cordless tool, said rod having a top end, a bottom end and an outer surface extending between said top end and said bottom end, said top end being insertable into said rod well in said bottom end of said handle of said cordless tool;

a ratchet driver being attached to said rod, said socket being attachable to said ratchet driver thereby facilitating said rod to be manipulated to loosen the top nut on the fire hydrant when said cordless tool has insufficient torque to loosen the top nut, said ratchet driver being disposed on said bottom end of said rod, said ratchet driver having a top face and a bottom face, said ratchet driver being oriented such that an axis extending between said top face and said bottom face is perpendicularly oriented with an axis extending between said top end and said bottom end of said rod, said ratchet driver having an output being shaped in a cube thereby facilitating said output to engage said output well in said rear end of said socket, said output being rotatably disposed on said bottom face of said ratchet driver, said ratchet driver including a direction knob being rotatably disposed on said top face, said direction knob being in mechanical communication with said output to adjust a rotational direction of the output between a counterclockwise direction and a clockwise direction; and a prying tool being coupled to said rod, said prying tool having a claw element and a hook element wherein each of said claw element and said hook element are each configured to grip an object for prying the object, said prying tool having a first end, a second end and an outside surface extending between said first end and said second end, said outside surface having a front side and a back side, said prying tool having a series of bends being spaced apart from each other and being distributed from the first end toward said second such that said first end is directed toward said front side of said outside surface thereby defining said claw element, said prying tool having a curve extending from said second end toward said first end such that said second end is directed toward said front side of said outside surface thereby defining said hook element, said back side of said outside surface being attached to said outer surface of said rod at a connection point extending between said curve and said series of bends, said prying tool being positioned closer to said bottom end of said rod than said top end of said rod.

* * * * *